July 6, 1965            G. A. ALTGELT            3,192,618

METHOD OF REPAIRING AIRCRAFT CYLINDER HEADS

Filed Feb. 18, 1964            2 Sheets-Sheet 1

GEORGE A. ALTGELT
INVENTOR.

BY John C. Stahl

ATTORNEY

GEORGE A. ALTGELT
INVENTOR.

BY John C. Stahl

ATTORNEY

United States Patent Office

3,192,618
Patented July 6, 1965

3,192,618
METHOD OF REPAIRING AIRCRAFT
CYLINDER HEADS
George A. Altgelt, 8815 Pineridge, San Antonio, Tex.
Filed Feb. 18, 1964, Ser. No. 345,772
7 Claims. (Cl. 29—402)

The present invention relates to a method of repairing aircraft cylinder heads and more particularly to a method of repairing damaged aluminum aircraft cylinder heads and parts thereof whereby the cylinder head may be returned to serviceable condition.

The shortage of parts for certain aircraft and the great expense of such parts, even when available, makes it imperative that many parts formerly disposed of be reworked and re-used, where practicable. The subject invention pertains to the reworking and reclamation of worn, cracked, broken and otherwise unserviceable aircraft cylinder heads, aimed at restoring them to a condition which will enable them to perform satisfactorily.

The subject invention relates to inert-gas shielded, arc welding of preheated aluminum cylinder heads. Properly preheated aluminum castings are relatively stress free and show no evidence of thermal shock after being welded. Coalescence of the filler material with the base material is produced by heating the base material with an electric arc between a metal electrode and the work. Shielding is obtained from an inert gas, such as argon or helium, of high purity—this prevents oxidation of the weld material.

There is only a very small percentage, not exceeding four per cent, of non-repairable damage to aircraft cylinder heads which cannot be corrected utilizing the aforementioned process. These non-repairable damages include faulty casings or cylinder head cracks resulting from excessive porosity, cylinder head corrosion, loose fitting cylinder head to barrel, combustion leaks at barrel and head connections and casting fissures or cracks located in positions where they are physically impossible to reach. Damages to cylinder heads not falling within one of these categories normally may be repaired utilizing the process of the subject invention.

An object of the present invention is the provision of a method of repairing aircraft cylinder heads.

Another object is to provide a method for reworking damaged parts of an aluminum cylinder head.

A further object of the invention is the provision of a method whereby damaged aluminum cylinder heads may be repaired and returned to serviceable condition at substantially less cost than the replacement thereof.

Still another object is to provide a method whereby a damaged part may be repaired and returned to use when a replacement part is not readily available.

Other objects and features of the invention will become apparent to those skilled in the art as the disclosure is made in the following detailed description of preferred embodiments of the invention as illustrated in the accompanying sheets of drawing in which.

Figure 1:
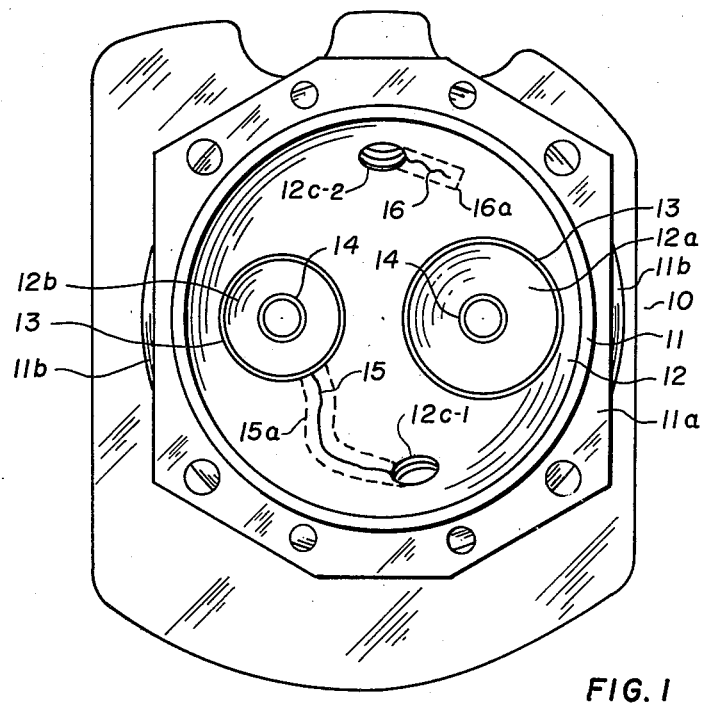
FIG. 1 is a top plan view looking into the barrel of an aircraft cylinder, showing a crack occurring between a spark plug boss and the exhaust seat and a second crack in proximity to the second spark plug boss.

Referring now to the drawings, wherein like reference characters designate like or corresponding parts throughout the several views, there is shown in FIG. 1 an aircraft cylinder 10 consisting of a barrel 11 and cylinder head 12. Barrel 11 is composed of chrome-molybdenum steel or the like and includes a flange 11a and cooling fins 11b on the outer surface thereof.

Cylinder head 12 is composed of cast or forged aluminum and as viewed in FIG. 1 includes an inlet port 12a, exhaust port 12b and spark plug boss 12c–1–12c–2 into which screwingly insert helicoils (not shown). Valve seats 13, composed of steel, and valve guides 14, composed of bronze or the like, are installed in the cylinder head 12 at the factory as is barrel 11 which is attached to the cylinder head. Cylinder head cracks or damage extending to areas adjacent to the valve seats, valve guides, spark plug bushings or helicoils must have these parts removed in order to complete the inspection and repair of the damage, as will hereinafter be described in detail.

INSPECTION

In practicing the invention, all paint and carbon deposits are to be removed from the cylinder head, both internally and externally. Any commercially-available cleaning material suitable for use with both aluminum and steel, as for example, "Carbostrip" manufactured by Turco Products, Inc., Newark, New Jersey, may be utilized. The cylinder is then blasted, both internally and externally, utilizing sand, walnut hulls or glass beads and conventional apparatus.

The cylinder is then preheated to 175°–200° Fahrenheit and inspected by conventional dye-penetrant or fluorescent type inspection methods, as for example, the "Dy-Chek" and "Zyglo" processes, to determine the type and locations of cracks or damage. "Dy-Chek" is a dye-penetrant manufactured by Turco Products, Inc., of Newark, New Jersey; the process is covered by United States Letters Patent Nos. 2,667,070 and 2,764,556.

The cylinder head may also be immersed in a solution of chromic acid (33 ounces/gallon) and heated to 144°±5° Fahrenheit for approximately one hour after which the cylinder is rinsed in water and heated to 450° Fahrenheit. Beads of reddish-brown color outline the limits of the crack.

As heretofore mentioned, valve seats, valve guides, spark plug bushings and helicoils must be removed in order to complete the inspection and repair if the damage is in proximity to such parts. Cylinder heads with damage resulting from broken valves must have both valve seats removed before inspection.

REPAIR

There is shown in FIG. 1 of the drawings examples of internal spark plug boss damage. The crack 15, for example, extends from the spark plug boss 12c–1 to the valve seat 13 on the exhaust port 12b while crack 16 radiates from spark plug boss 12c–2. Cracks 15 and 16, if occurring in the same cylinder head, may be repaired simultaneously. Preferably, however, the smaller crack or lesser damage is repaired first; in the event that there are several cracks in the cylinder head it has been found convenient to first repair the most accessible crack or damaged area.

All material immediately bounding the crack or cracks is removed in any suitable manner as by drilling or using a rotary file to form a channel. The channel must be U-shaped in section, preferably of uniform depth and width, with the side wall and bottom surfaces smooth. If the crack extends into the seat boss, as exemplified by crack 15, the channel is to be cut open to the seat boss as shown in dotted line portions 15a. Where the crack does not extend into the seat boss, however, as exemplified by crack 16, the end of the channel is to be bevelled at an angle of 30° which terminates in the cylinder head surface.

Barrel 11 is then placed over a shielded gas burner or placed in an electric oven and the cylinder head heated to 600°–650° Fahrenheit. A conventional temperature stick or other temperature indicating means may be utilized to determine when the desired temperature has been reached.

The cylinder 10 is next suitably supported whereby the damaged portions are conveniently accessible. The area in proximity to the crack or damage to be repaired is heated with a #8 oxy-acetylene torch until the area where the weld is to begin becomes fluid. An inert-gas, shielded torch, such as "Heliweld," manufactured by Airco of New York, New York, is then utilized to weld this area, using an uncoated aluminum filler rod. A rod containing the same basic components as the base metal should be selected. Sufficient metal must be deposited to permit machining of the repaired portions to the original dimensions. There is shown in Table 1 recommended current ratings and gas flow for repairing various thicknesses of metal, as given in inches.

*Table 1*

| Metal thickness, inches | Tungsten electrode diameter, inches | Alternating current with high frequency and D.C. component | |
|---|---|---|---|
| | | Current range, amperes | Argon flow, cu. ft./hr. |
| 1/16 | 1/16 | 60–80 | 10–15 |
| 3/32 | 1/16–3/32 | 75–125 | 14–18 |
| 1/8 | 3/32 | 125–160 | 15–18 |
| 3/8 | 3/16–1/4 | 330–380 | 19–29 |
| 1/2 | 3/16–1/4 | 350–400 | 30 |
| 3/4 | 1/4 | 550–600 | 30 |

It is to be understood that although the use of high purity argon has been specified in Table 1, the invention is not restricted solely to the use of such inert gas; castings can be welded utilizing either argon or helium with approximately equal success; however, approximately twice as much helium as argon is used per hour for equally effective shielding. Helium gas gives deeper penetration whereas argon gas gives better coverage. Helium and argon gasses mix readily and a mixture of the two gasses, in equal proportions, provides advantageous results. Furthermore, when welding with alternating current, straight polarity, although an argon atmosphere is not as hot as helium the arc length can be changed without appreciably changing the heat input to the work whereas with helium a small variation in arc length will result in a greater variation in arc voltage than with argon.

Conventional gas control equipment is utilized to provide a uniform flow of the desired quantity of such inert gas.

Heavy cast aluminum or materials one-quarter inch or more in thickness requires multiple beads for maximum strength. Medium size beads are preferred for general purpose welding as they give a better appearance, maximum strength and reduce the amount of finishing work. The first pass should be a root weld which provides complete fusion at the bottom of the U-shaped channel. Continuous welding is satisfactory as long as the cylinder head remains at preheated temperatures; if the temperature of the cylinder head falls below 600° Fahrenheit, however, the cylinder head must be reheated.

The remaining cracks or damage is to be repaired in like manner. After all damage has been repaired the cylinder is allowed to return to ambient temperature slowly. A rotary file, fly-cutter or other suitable means is utilized to rework and shape the cylinder head to its original configuration. The cylinder head is heated to 175°–200° Fahrenheit over a gas flame or the like and the cylinder checked with a dye-penetrant or fluorescent type inspection. If such inspection reveals no cracks, the cylinder head is reheated to approximately 550° Fahrenheit and allowed to heat soak at such temperature for approximately 45 minutes to stress relieve the cylinder, after which it is permitted to air cool slowly. The cylinder is then checked once again, using the aforementioned dye-penetrants or fluorescent type inspection methods.

The cylinder barrel 11 is then ground oversize and chrome plated by any conventional process, thus restoring the complete cylinder assembly to the manufacturer's new limits. To insure that all loose metal particles have been removed, the cylinder may then be electro-cleaned whereby a reverse current, varying from 2–3 amperes/sq. inch of inner surface area of the barrel, is passed through the cylinder for approximately 30–45 seconds.

When damage occurs to the spark plug boss threads under a helicoil it is necessary to first remove the helicoil after which the spark plug boss is bored out to remove all threaded portions. The cylinder head is then preheated to 600°–650° Fahrenheit after which the internal spark plug boss is welded over as heretofore described using a "Heliweld" torch operating at 280–300 amperes, alternating current; the cylinder is then inverted and the external spark plug boss area is welded. New threads are bored and tapped, the spark plug seat is spot faced and the internal spark plug boss re-contoured to its original configuration. If the repair inspection is satisfactory, the cylinder is reheated and re-checked in the manner heretofore described in detail.

When the cylinder head is damaged by broken valves it is necessary to remove the valve seats before inspection and repair. All damaged portions of the cylinder head are removed as by using a rotary file or the like; the channel thus provided must be equal or greater in width than in depth. Each end of the channel is to be bevelled at an angle which may vary from 15° to 45°; if the damage extends into either valve seat boss or spark plug boss, however, the channel is to be cut open and extend thereinto. After preheating the cylinder to the desired temperature, the channel is welded with a "Heliweld" torch operating at 280–325 amperes, alternating current. After all repairs have been made and the cylinder is allowed to return to ambient temperature, the inside of the combustion chamber is machined to the original configuration. If inspection is satisfactory, the valve seat bosses are bored to accommodate oversize valve seats. The cylinder is reheated and re-checked in accordance with the teachings of the invention.

Figure 2:
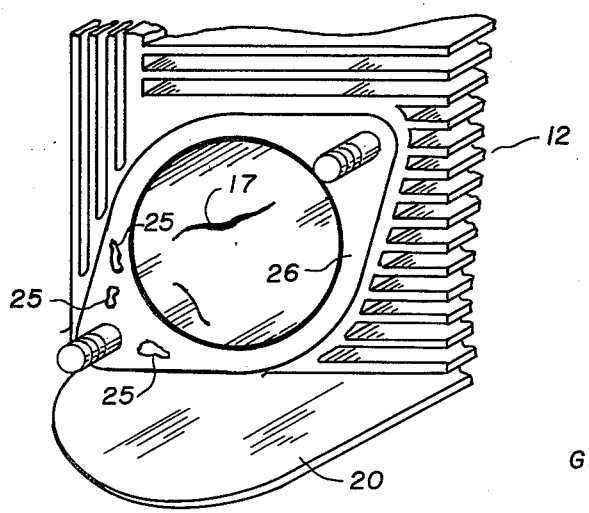
FIG. 2 is an isometric view looking into the exhaust port of an aircraft cylinder showing a crack therein and an eroded area on the mating surface.

There is shown in FIG. 2 of the drawings a crack 17 in the internal exhaust port of the cylinder. Such a crack, of any length, may be repaired in accordance with the principles heretofore specified provided that the crack surfaces at least one-quarter inch from the inside diameter of the valve guide boss or one-quarter inch from the valve seat boss and the crack is not more than one-quarter inch in depth. The crack is to be removed with a rotary file or the like; after preheating the cylinder head to 600°–650° Fahrenheit, the cylinder is supported with the crack preferably in an essentially horizontal plane. The damage is repaired with the "Heliweld" torch operating at 150–175 amperes. The cylinder is allowed to air cool slowly after which the inside of the repaired port area is re-contoured to the original shape, reheated and re-checked in the manner heretofore described in detail.

Figure 3:
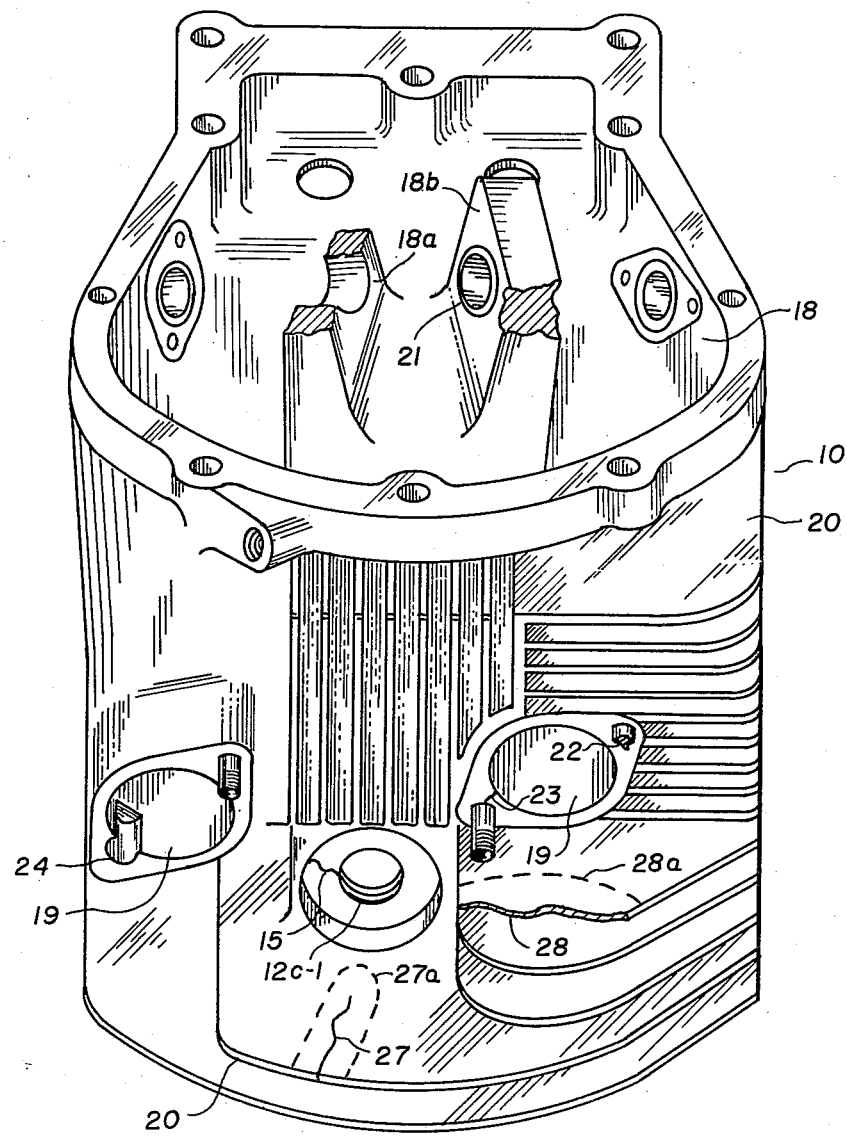
FIG. 3 is a fragmentary, 45° pictorial view showing damage to the rocker box assembly, a crack in the external spark plug boss, a broken exhaust port stud, and broken and cracked cooling fins.

The cylinder head 10, as best seen in FIG. 3 of the drawings, includes a rocker box section 18, ports 19 and cylinder head cooling fins 20. As often occurs, the rocker shaft bosses 18a–18b may be damaged or broken. As viewed in FIG. 3 the boss 18a is completely broken off while only a portion of boss 18b has been damaged. In those cylinders including inserts 21 such parts must be removed from the damaged boss prior to inspection and repair. With a rotary file or the like the remainder of the broken boss 18a is removed to provide a smooth surface; if required, a U-shaped channel may be provided in the surface of the rocker box section. The cylinder head is inspected and preheated in the manner heretofore described. In welding, deep penetrating passes must be made with the torch until the foundation weld is completed, after which it is necessary to continue to weld beads, one upon another, until the rocker boss is of the desired unfinished dimensions. After the cylinder has returned to ambient temperature the rocker boss is milled to the original dimensions and as required, rotary filed to finish the outside surfaces. The rocker boss shaft hole is located, drilled and reamed in accordance with the manufacturer's specifications. The reheating and re-checking steps are then to be followed.

Referring again to FIG. 3 of the drawings, there is shown a broken exhaust port stud 22 and a crack 23 radiating from the second stud. Both of these repairs may be made in accordance with the teachings of the subject invention. In the event that the stud 22 may conveniently be removed but the threads are stripped or pulled, the damaged threads are milled out preparatory to welding. In those cases where the studs have been broken off at or below the surface of the exhaust port and cannot be removed and in those cases where there is other damage in proximity to a stud, as exemplified by crack 23, it is necessary to remove the lower portion of the stud and the material bounding the crack as by drilling or using a rotary file. A semi-circularly shaped cut 24 is to be provided, said cut extending into the inside of the port, as illustrated in FIG. 3; the cut must be 2½ times greater in width than the diameter of the stud and should extend below the lower limit of the stud or threaded portions. Such type cut provides for easy removal of broken studs, stud inserts or broken or damaged threads. The remaining steps of the process may then be completed after which the desired position may be drilled and tapped to accommodate a standard stud; any additional machine work may also be completed to return this portion of the cylinder head to its original configuration.

Damaged aluminum crank cases, excluding the webs and supporting structures, may also be repaired in accordance with the teachings of the invention.

Minor repairs to aircraft cylinder heads include eroded areas on mating surfaces, damaged or broken cowling lugs and cracked or broken cooling fins. For example, the eroded area 25 on mating surface 26 (see FIG. 2) is removed by rotary filing or the like; the cavity thus formed is then welded in the manner heretofore described after which the surface is machined to its original configuration.

Damaged or broken cowling lugs (not shown) may be repaired by building up the damaged or broken portions as by welding after which the lug is machined and if necessary, redrilled.

As best seen in FIG. 3 of the drawings, a crack 27 occurs in a cooling fin and the outermost portion of a second fin has been broken off as indicated by reference number 28. The cracked or broken portions of the fins are removed beyond the depth of the crack or break as by means of a thin rotary file or other conventional apparatus to provide a smooth edge; the crack 27 is to be reworked to the dotted line portions 27a while the broken edge of a fin is to be reworked to provide a smooth, even surface as shown by dotted line portions 28a. The removed areas of the fins are then built back to the required unfinished dimensions after which the repaired portions may be machined to the original configuration. Alternatively, a suitable support may be inserted between adjacent fins to provide a surface on which the newly deposited weld may be supported. Support means is also required where an attempt is made to join a broken portion to the basal portion of the fin.

If any of the aforementioned repairs are rejected due to a positive dye-penetrant or fluorescent type inspection, all areas adjacent to the repair are to be re-inspected for possible stress cracks. A drill or rotary file may be used to determine the depth of the faulty repair. If such inspection reveals no detrimental thermal shock the part may again be repaired in accordance with the aforementioned steps. However, if such inspection reveals stress cracks resulting from such repairs, the cylinder must be rejected.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

Having thus described the invention, what is claimed is:

1. A method of repairing damaged aluminum cylinder heads comprising the steps of
    cleaning the cylinder head both internally and externally,
    blasting the cylinder head both internally and externally with a material selected from the group consisting of sand, walnut hulls and glass beads,
    preheating the cylinder heads to 175°–200° Fahrenheit,
    inspecting the cylinder head internally and externally to determine the location of damage,
    removing all material bounding the damaged portions of the cylinder head,
    heating the cylinder to 600°–650° Fahrenheit,
    heating the portion of the cylinder head where the damage occurs until said portion begins to become fluid,
    welding the damaged portions utilizing an inert gas and a filler rod containing the same basic composition as the composition of the cylinder head,
    allowing the cylinder head to slowly return to ambient temperature,
    reworking the repaired portions to return the cylinder head to its original configuration,
    heating the cylinder head to 175°–200° Fahrenheit and inspecting the cylinder head,
    heat soaking the cylinder head at approximately 550° Fahrenheit for approximately 45 minutes,
    allowing the cylinder head to slowly return to ambient temperature,
    inspecting the cylinder head, and
    chrome plating the cylinder barrel.

2. A method of repairing damaged aluminum cylinder heads comprising the steps of
    cleaning the cylinder head internally and externally,
    heating the cylinder head to 175°–200° Fahrenheit,
    inspecting the cylinder head internally and externally to determine the location of damage,
    removing all material bounding the damaged portions of the cylinder head,
    heating the cylinder to 600°–650° Fahrenheit.
    heating the portion of the cylinder head where the damage occurs until said portion becomes fluid,
    welding the damaged portion utilizing an inert gas and a filler rod containing the same basic composition as the composition of the cylinder head,
    allowing the cylinder head to cool slowly,
    reworking the repaired portions to return the cylinder head to its original configuration,
    heating the cylinder head to 175°–200° Fahrenheit and inspecting the cylinder head,
    heat soaking the cylinder head at approximately 550° Fahrenheit for approximately 45 minutes,
    allowing the cylinder head to cool slowly,
    inspecting the cylinder head, and
    chrome plating the cylinder barrel.

3. A method of repairing a damaged aluminum cylinder head comprising the steps of
    cleaning the cylinder head internally and externally,
    heating the cylinder head to at least 175° Fahrenheit,
    inspecting the cylinder head internally and externally to determine the location of damage, removing all material bounding the damaged portions of the cylinder head,
heating the cylinder to at least 600° Fahrenheit,
heating the portion of the cylinder head where the damage occurs until said portion begins to become fluid,
welding the damaged portions utilizing an inert gas and a filler rod containing the same basic composition as the composition of the cylinder head,
allowing the cylinder head to cool slowly,
reworking the repaired portions to return the cylinder head to its original configuration,
heating the cylinder head to at least 175° Fahrenheit and inspecting the cylinder head,
heat soaking the cylinder at approximately 550° Fahrenheit for at least 45 minutes.
allowing the cylinder head to cool slowly,
inspecting the cylinder head, and
chrome plating the cylinder barrel.

4. A method of repairing damaged aluminum castings comprising the steps of
cleaning the casting internally and externally,
blasting the casting internally and externally with a material selected from the group consisting of sand, walnut hulls and glass beads,
heating the casting to 175°–200° Fahrenheit,
inspecting the casting internally and externally to determine the location of damage,
removing all material bounding the damaged portions of the casting,
heating the casting to 600°–650° Fahrenheit,
heating the portion of the casting where the damage occurs until said portion begins to become fluid,
welding the damaged portion utilizing an inert gas selected from the group consisting of argon and helium and a filler rod of essentially the same composition as the casting,
allowing the casting to slowly return to ambient temperature,
reworking the repaired portions to return the casting to its original configuration,
heating the casting to 175°–200° Fahrenheit and inspecting the casting,
heat soaking the casting at approximateley 550° Fahrenheit for approximately 45 minutes,
allowing the casting to slowly return to ambient temperature, and
inspecting the casting.

5. A method of repairing damaged aluminum castings comprising the steps of
cleaning the casting internally and externally,
heating the casting of 175°–200° Fahrenheit,
inspecting the casting internally and externally to determine the location of damage,
removing all material bounding the damaged portions of the casting,
heating the casting to 600°–650° Fahrenheit,
heating the portion of the casting where the damage occurs until said portion becomes fluid,
welding the damaged portion utilizing an inert gas and a filler rod of essentially the same composition as the casting,
allowing the casting to cool slowly,
reworking the repaired portions to return the casting to its original configuration,
heating the casting to 175°–200° Fahrenheit and inspecting the casting,
heat soaking the casting at approximately 550° Fahrenheit for approximately 45 minutes,
allowing the casting to cool slowly, and
inspecting the casting.

6. A method of repairing aluminum castings comprising the steps of cleaning the casting internally and externally,
preheating the casting to at least 175° Fahrenheit,
inspecting the casting internally and externally to determine the location of damage,
remove all material bounding the damaged portions of the casting,
heating the casting to at least 600° Fahrenheit,
heating the portion of the casting where the damage occurs until said portion begins to become fluid,
welding the damaged portions utilizing an inert gas selected from the group consisting of argon and helium and a filler rod of essentially the same composition as the casting,
allowing the casting to slowly cool,
reworking the repaired portions to return the casting to its original configuration,
heating the casting to at least 175° Fahrenheit and inspecting the casting,
heat soaking the casting at approximately 550° Fahrenheit for at least 45 minutes,
allowing the casting to slowly cool, and
inspecting the casting.

7. A method of repairing damaged aluminum cylinder heads comprising the steps of
cleaning the cylinder head internally and externally,
preheating the cylinder to 175°–200° Fahrenheit,
inspecting the cylinder head internally and externally utilizing a dye-penetrant,
removing all material bounding the damaged portions of the cylinder head,
heating the cylinder to 600°–650° Fahrenheit,
heating the portion of the cylinder head where the damage occurs until said portion becomes fluid,
welding the damaged portion utilizing an inert gas and a filler rod of essentially the same composition as the cylinder head,
cooling the cylinder head slowly,
reworking the repaired portions to their original configuration,
heating the cylinder head to 175°–200° Fahrenheit and inspecting the cylinder head utilizing a dye-penetrant,
heat soaking the cylinder head at approximately 550° Fahrenheit for at least 45 minutes,
cooling the cylinder head slowly, and
inspecting the cylinder head with a dye-penetrant.

References Cited by the Examiner
UNITED STATES PATENTS 2,632,944   3/53   Kittelson _____ 29—402
2,751,671   6/56   Welch et al. _____ 29—402

WHITMORE A. WILTZ, Primary Examiner.